United States Patent
Zheng et al.

(10) Patent No.: US 11,570,049 B2
(45) Date of Patent: Jan. 31, 2023

(54) NETWORK CONFIGURATION METHOD, APPARATUS, AND SYSTEM

(71) Applicant: HUAWEI TECHNOLOGIES CO., LTD., Guangdong (CN)

(72) Inventors: Guangying Zheng, Nanjing (CN); Wang Yang, Nanjing (CN); Tao Sun, Nanjing (CN); Jun Mei, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/179,683

(22) Filed: Feb. 19, 2021

(65) Prior Publication Data

US 2021/0176131 A1 Jun. 10, 2021

Related U.S. Application Data

(63) Continuation of application No. PCT/CN2019/101406, filed on Aug. 19, 2019.

(30) Foreign Application Priority Data

Aug. 20, 2018 (CN) .......................... 201810950664.2

(51) Int. Cl.
*H04L 12/24* (2006.01)
*G06F 40/35* (2020.01)
(Continued)

(52) U.S. Cl.
CPC .......... *H04L 41/0886* (2013.01); *G06F 40/35* (2020.01); *H04L 61/5007* (2022.05)

(58) Field of Classification Search
CPC ............. H04L 41/0886; H04L 61/2007; H04L 61/5007; G06F 40/35
See application file for complete search history.

(56) References Cited

U.S. PATENT DOCUMENTS 7,587,483 B1 9/2009 Florissi et al.
9,900,209 B2 2/2018 Dec et al.
(Continued)

FOREIGN PATENT DOCUMENTS

CN 103281197 A 9/2013
CN 104243198 A 12/2014
(Continued)

OTHER PUBLICATIONS

Request for Comments: 7950, M. Bjorklund, Ed. et al, The YANG 1.1 Data Modeling Language, Internet Engineering Task Force (IETF), Aug. 2016, total 217 pages.

*Primary Examiner* — Christopher B Robinson
(74) *Attorney, Agent, or Firm* — Womble Bond Dickinson (US) LLP (57) ABSTRACT

This application provides a network configuration method, apparatus, and system. The method includes: determining, based on a mapping relationship, that a first data node in a first YANG data model corresponds to a second data node in a second YANG data model, where the first data node and the second data node include a same indication operation, and the mapping relationship includes a correspondence between a data node in the first YANG data model and a data node in the second YANG data model; and generating a first packet based on the second data node.

12 Claims, 5 Drawing Sheets

(51) Int. Cl.
*H04L 29/12* (2006.01)
*H04L 41/08* (2022.01)
*H04L 61/5007* (2022.01)

(56) References Cited

U.S. PATENT DOCUMENTS

| | | | |
|---|---|---|---|
| 2013/0170492 A1* | 7/2013 | Lu | H04L 12/4625 |
| | | | 370/392 |
| 2017/0078158 A1* | 3/2017 | Dec | H04L 41/0869 |
| 2017/0187577 A1 | 6/2017 | Nevrekar et al. | |
| 2018/0013662 A1* | 1/2018 | Salam | H04L 12/4641 |
| 2018/0026834 A1 | 1/2018 | Dec et al. | |
| 2018/0176096 A1 | 6/2018 | Prabakaran et al. | |
| 2018/0212872 A1* | 7/2018 | Zhuang | H04L 47/825 |

FOREIGN PATENT DOCUMENTS

| | | | | |
|---|---|---|---|---|
| CN | 105635223 A | 6/2016 | | |
| CN | 106559251 A | 4/2017 | | |
| CN | 107241221 A | 10/2017 | | |
| CN | 107302443 A | 10/2017 | | |
| CN | 107872337 A | 4/2018 | | |
| CN | 108241892 A | 7/2018 | | |
| KR | 20140111939 A | * | 9/2014 | |
| WO | WO-2017054531 A1 | * | 4/2017 | H04L 29/06 |

* cited by examiner

NETWORK CONFIGURATION METHOD, APPARATUS, AND SYSTEM

CROSS-REFERENCE TO RELATED APPLICATIONS

This application is a continuation of International Application No. PCT/CN2019/101406, filed on Aug. 19, 2019, which claims priority to Chinese Patent Application No. 201810950664.2, filed on Aug. 20, 2018. The disclosures of the aforementioned applications are hereby incorporated by reference in their entireties.

TECHNICAL FIELD

This application relates to the field of computer technologies, and in particular, to a network configuration method, apparatus, and system.

BACKGROUND

YANG is a data modeling language. Modeling may be performed on configuration data of a network configuration protocol (NETCONF), state data, remote procedure call, network management protocol event notification, and the like by using the YANG language. A NETCONF and a YANG data model may be used to implement automatic operations on a network device.

An automatic network configuration system includes a control device and a network device. The NETCONF data model and the YANG data model are loaded on each of the control device and the network device, and a user automatically configures the network device by using the control device. In a practical application process, the YANG data model may be defined by each organization, so that there are a plurality of types of YANG data models in the industry. Therefore, the YANG data model loaded on the control device may be different from the YANG data model loaded on the network device. When the YANG data model on the control device is different from the YANG data model on the network device, the user cannot perform automatic network configuration on the network device by using the control device. Currently, a staff member usually learns the YANG data model on the network device and the YANG data model on the control device, to write a translation script between the YANG data model on the network device and the YANG data model on the control device, and then perform network configuration on the network device by using the control device.

However, to manually write the translation script, the staff member needs to first thoroughly learn the YANG data models. In addition, a speed of manually writing the translation script is very low. Consequently, efficiency of conversion between the YANG data models is low, and then efficiency of network configuration is low.

SUMMARY

This application provides a network configuration method, apparatus, and system, to improve efficiency of network configuration.

According to a first aspect, this application provides a network configuration method. The method may be performed by a control device or a network device. A mapping relationship is loaded on the control device and/or the network device. The control device or the network device may determine, based on the mapping relationship, that a first data node in a first YANG data model corresponds to a second data node in a second YANG data model, and generate a first packet based on the second data node. The first data node and the second data node include a same indication operation. The mapping relationship includes a correspondence between a data node in the first YANG data model and a data node in the second YANG data model.

The mapping relationship is loaded on the control device and/or the network device. When automatic network configuration is performed, before any one of the control device and the network device sends a packet, a data node corresponding to the packet may be determined based on the mapping relationship, and a packet that can be identified by a peer device is generated based on the corresponding data node; or after any device receives a packet, a data node corresponding to the packet may be determined based on the mapping relationship, and a packet that can be identified by the device is generated based on the corresponding data node, so that the control device and the network device can identify a packet sent by the peer device, thereby implementing automatic network configuration.

In an embodiment, the correspondence between the data node in the first YANG data model and the data node in the second YANG data model includes a correspondence between a plurality of groups of data nodes, and a process of determining a correspondence between each group of data nodes is the same. The following describes in detail a process of determining a correspondence between a third data node in the first YANG data model and a fourth data node in the second YANG data model:

determining attribute information of the third data node in the first YANG data model, where the third data node is configured to indicate a first indication operation in the first YANG data model; determining attribute information of the fourth data node in the second YANG data model, where the fourth data node is configured to indicate a second indication operation in the second YANG data model; determining, based on the attribute information of the third data node and the attribute information of the fourth data node, that the first indication operation and the second indication operation include a same indication operation; and generating the correspondence between the third data node and the fourth data node.

In the foregoing process, because the correspondence may be generated based on a similarity between attribute information of the data node in the first YANG data model on the control device and attribute information of the data node in the second YANG data model on the network device, there is no need to manually learn different YANG data models and compile a translation script between two YANG data models. In this way, development of conversion code is reduced, efficiency of generating the mapping relationship is improved, and then efficiency of network configuration is improved, to implement real intelligent conversion.

In an embodiment, the method further includes: obtaining the first data node from a second packet, where the second packet is generated based on the first data node.

In an embodiment, the determining, based on the attribute information of the third data node and the attribute information of the fourth data node, that the first indication operation and the second indication operation include a same indication operation includes:

determining, based on a matching value between the attribute information of the third data node and the attribute information of the fourth node, that the first indication operation and the second indication operation include the same indication operation, where the matching value is obtained by calculating a text similarity between the attribute information of the third data node and the attribute information of the fourth node.

In the foregoing process, the matching value between the attribute information of the third data node and the attribute information of the fourth data node is determined based on the text similarity between the attribute information of the third data node and the attribute information of the fourth data node. When the matching value is greater than a preset threshold value, it indicates that the third data node corresponds to the fourth data node. Therefore, the first indication operation and the second indication operation include the same indication operation. In this way, the correspondence between the third data node and the fourth data node may be accurately determined.

According to a second aspect, this application provides a network configuration apparatus, including a first determining module and a generation module.

The first determining module is configured to determine, based on a mapping relationship that a first data node in a first YANG data model corresponds to a second data node in a second YANG data model. The first data node and the second data node include a same indication operation. The mapping relationship includes a correspondence between a data node in the first YANG data model and a data node in the second YANG data model.

The generation module is configured to generate a first packet based on the second data node.

In an embodiment, the apparatus further includes a second determining module and a generation module.

The second determining module is configured to determine attribute information of a third data node in the first YANG data model. The third data node is configured to indicate a first indication operation in the first YANG data model.

The second determining module is further configured to determine attribute information of a fourth data node in the second YANG data model. The fourth data node is configured to indicate a second indication operation in the second YANG data model.

The second determining module is further configured to determine, based on the attribute information of the third data node and the attribute information of the fourth data node, that the first indication operation and the second indication operation include a same indication operation.

The generation module is configured to generate a correspondence between the third data node and the fourth data node.

In an embodiment, the apparatus further includes an obtaining module.

The obtaining module is configured to obtain the first data node from a second packet. The second packet is generated based on the first data node.

In an embodiment, the second determining module is configured to:

determine, based on a matching value between the attribute information of the third data node and the attribute information of the fourth node, that the first indication operation and the second indication operation include the same indication operation. The matching value is obtained by calculating a text similarity between the attribute information of the third data node and the attribute information of the fourth node.

According to a third aspect, this application provides a network configuration apparatus, including a memory and a processor. The processor executes a program instruction in the memory, to implement the network configuration method according to any one of the possible implementations of the first aspect.

According to a fourth aspect, this application provides a computer-readable storage medium, including an instruction. When the instruction is run on a computer, the computer is enabled to perform the network configuration method according to any one of the possible implementations of the first aspect.

In a fifth aspect, this application provides a network configuration system, including a first device and a second device. The first device and/or the second device include/includes the network configuration apparatus according to any one of the possible implementations of the second aspect.

According to the network configuration method, apparatus, and system provided in this application, the mapping relationship is loaded on the control device and/or the network device. When automatic network configuration is performed, any one of the control device and the network device may convert, based on the mapping relationship, a sent packet into a packet that can be identified by a peer device; or any device may convert, based on the mapping relationship, a received packet into a packet that can be identified, so that the control device and the network device can identify a packet sent by the peer device, thereby implementing automatic network configuration. Further, because the mapping relationship may be generated based on the similarity between the attribute information of the data node in the first YANG data model on the control device and the attribute information of the data node in the second YANG data model on the network device, there is no need to manually learn the different YANG data models and compile the translation script between the two YANG data models. In this way, development of conversion code is reduced, efficiency of generating the mapping relationship is improved, and then, efficiency of network configuration is improved, to implement real intelligent conversion.

DESCRIPTION OF EMBODIMENTS

Figure 1:
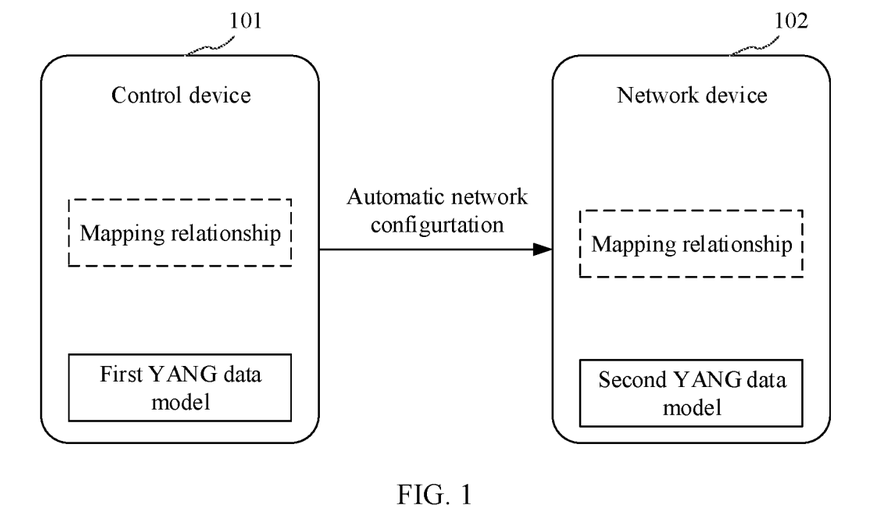
FIG. 1 is a schematic diagram of an architecture of a network configuration system according to this application.

FIG. 1 is a schematic diagram of an architecture of a network configuration system according to this application.

Referring to FIG. 1, a control device 101 and a network device 102 are included. A user may perform automatic network configuration on the network device 102 by using the control device 101. In an embodiment, the control device 101 may be a device that has a function of configuring the network device 102. For example, the control device may be a computer, a network management device, or software that has a network management function. In an embodiment, the network device 102 may be a switch, a router, a gateway, an access point device, or the like.

The control device 101 and the network device 102 each are loaded with at least one YANG data model. For example, a YANG data model loaded on the control device 101 is a first YANG data model, a YANG data model loaded on the network device 102 is a second YANG data model, and the first YANG data model and the second YANG data model may be the same or may be different.

A YANG data model includes a plurality of data nodes. For example, the data nodes may include a leaf node, a leaf list node, a container node, and a list node. The control device or the network device may generate a packet by using one or more of the data nodes in the YANG data model. Attribute information of the data nodes includes an indication operation. For example, the indication operation may be network configuration, state data, or an event notification. For another example, the indication operation may be internet protocol (IP) configuration, route configuration, gateway address configuration, or state data obtaining. In an embodiment, one data node may include one indication operation, or the plurality of data nodes include one indication operation.

If two YANG data models are the same, data nodes in the two YANG data models are the same, to be specific, attribute information of the data nodes is the same, and association relationships (for example, reference relationships) between different data nodes are the same. If the attribute information of the data nodes in the two YANG data models is different, or the association relationships between the data nodes are different, the two YANG data models are different YANG data models.

The different YANG data models include different data nodes. The different data nodes may include a same indication operation, and packets generated based on the different data nodes have a same indication operation. However, formats of the packets that are generated based on the different data nodes and that have the same indication operation may be different. For example, if each of an indication operation included in a first data node in the first YANG data model and an indication operation included in a second data node in the second YANG model is an IP address configuration operation, a packet generated based on the first data node and a packet generated based on the second data node each have an IP address configuration function. However, a format of the packet that is generated based on the first data node and that has the IP address configuration function may be different from a format of the packet that is generated based on the second data node and that has the IP address configuration function.

In an embodiment, only after one YANG data model is loaded on a device, the device can identify a packet generated based on a data node in the YANG data model. For example, if the first YANG data model is loaded on the network device, the network device may identify a packet generated based on a data node in the first YANG data model. If the first YANG data model is not loaded on the network device, the network device cannot identify the packet generated based on the data node in the first YANG model.

When the first YANG data model on the control device 101 is different from the second YANG data model on the network device 102, and when the control device 101 performs network configuration on the network device 102 by using the packet, a mapping relationship needs to be loaded on the control device 101 or the network device 102. The mapping relationship indicates a correspondence between a node in the first YANG data model and a node in the second YANG data model. In this way, any device may convert, based on the mapping relationship, a sent packet into a packet that can be identified by a peer device, or any device may convert, based on the mapping relationship, a received packet into a packet that can be identified, so that the control device 101 and the network device 102 can identify a packet sent by the peer device, thereby implementing automatic network configuration.

In this application, the mapping relationship may be generated based on a similarity between attribute information of the data node in the first YANG data model on the control device 101 and attribute information of the data node in the second YANG data model on the network device 102, and there is no need to manually learn the different YANG data models and compile a translation script between the two YANG data models. In this way, development of conversion code is reduced, efficiency of generating the mapping relationship is improved, and then efficiency of network configuration is improved, to implement real intelligent conversion.

The following describes in detail technical solutions shown in this application with reference to specific embodiments. It should be noted that the following several specific embodiments may be combined with each other, and same or similar content is not described repeatedly in different embodiments.

Figure 2:
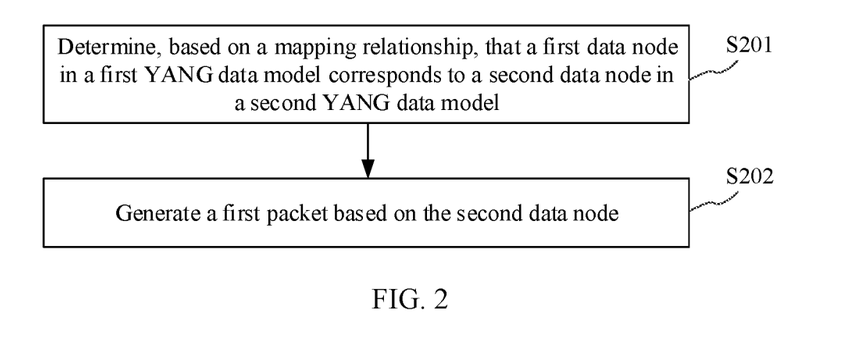
FIG. 2 is a schematic flowchart of a network configuration method according to this application.

FIG. 2 is a schematic flowchart of a network configuration method according to this application. Referring to FIG. 2, the method may include the following operations.

S201: Determine, based on a mapping relationship that a first data node in a first YANG data model corresponds to a second data node in a second YANG data model.

It should be noted that this operation may be implemented in a control device or may be implemented in a network device. In addition, this operation may also be implemented in a network configuration apparatus disposed in the network device or the control device. In an embodiment, the network configuration apparatus may be implemented by using software, or the network configuration apparatus may be implemented by combining software and hardware.

The first data node and the second data node include a same indication operation.

In an embodiment, the indication operation may be a network configuration operation, a state data obtaining operation, or the like.

For example, the indication operation may be IP address configuration, route configuration, gateway address configuration, or state data obtaining.

In an embodiment, the first data node and the second data node include the same indication operation. For example, a packet generated based on the first data node and a packet generated based on the second data node have a same operation indication.

For example, if the indication operation included in each of the first data node and the second data node is an IP address configuration operation, the packet generated based on the first data node has an IP address configuration function, and the packet generated based on the second data node also has the IP address configuration function.

The mapping relationship includes a correspondence between a data node in the first YANG data model and a data node in the second YANG data model.

In an embodiment, the mapping relationship may further include a correspondence between the data node in the first YANG data model and a data node in another YANG data model, or a correspondence between the data node in the second YANG data model and a data node in another YANG data model.

In an embodiment, packets generated based on corresponding data nodes in the first YANG data model and in the second YANG data model have a same operation indication, for example, the packets have a same network configuration function.

For example, assuming that a data node 1 of the first YANG data model corresponds to a data node 2 of the second YANG data model, a packet generated based on the data node 1 and a packet generated based on the data node 2 have a same operation indication.

In an embodiment, the correspondence between the data node in the first YANG data model and the data node in the second YANG data model may be shown in Table 1.

TABLE 1

| Data node in the first YANG data model | Data node in the second YANG data model |
|---|---|
| Data node a | Data node 1 |
| Data node b | Data node 2 |
| Data node c | Data node 3 |
| ... | ... |

Referring to Table 1, because the data node a of the first YANG data model corresponds to the data node 1 of the second YANG model, a packet generated based on the data node a and a data packet generated based on the data node 1 have a same operation indication.

It should be noted that Table 1 shows only an example of the correspondence between the data node in the first YANG data model and the data node in the second YANG data model, and does not limit the correspondence.

It should be noted that the correspondence between the data node in the first YANG data model and the data node in the second YANG data model may be generated based on a similarity between attribute information of the data node in the first YANG model and attribute information of the data node in the second YANG model. In the embodiment shown in FIG. 5, a process of generating the correspondence is described in detail, and details are not described herein again.

S202: Generate a first packet based on the second data node.

In an embodiment, after a second packet generated based on the first data node in the first YANG data model is obtained, based on the mapping relationship, that the second data node in the second YANG data model corresponds to the first data node in the first YANG data model; and the second packet is generated based on the second data node.

In the network configuration method provided in this application, the mapping relationship is loaded on the control device and/or the network device. When automatic network configuration is performed, any one of the control device and the network device may convert, based on the mapping relationship, a sent packet into a packet that can be identified by a peer device; or any device may convert, based on the mapping relationship, a received packet into a packet that can be identified, so that the control device and the network device can identify a packet sent by the peer device, thereby implementing automatic network configuration. Further, because the mapping relationship may be generated based on the similarity between the attribute information of the data node in the first YANG data model on the control device and the attribute information of the data node in the second YANG data model on the network device, there is no need to manually learn different YANG data models and compile a translation script between two YANG data models. In this way, development of conversion code is reduced, efficiency of generating the mapping relationship is improved, and then efficiency of network configuration is improved, to implement real intelligent conversion.

Figure 3:
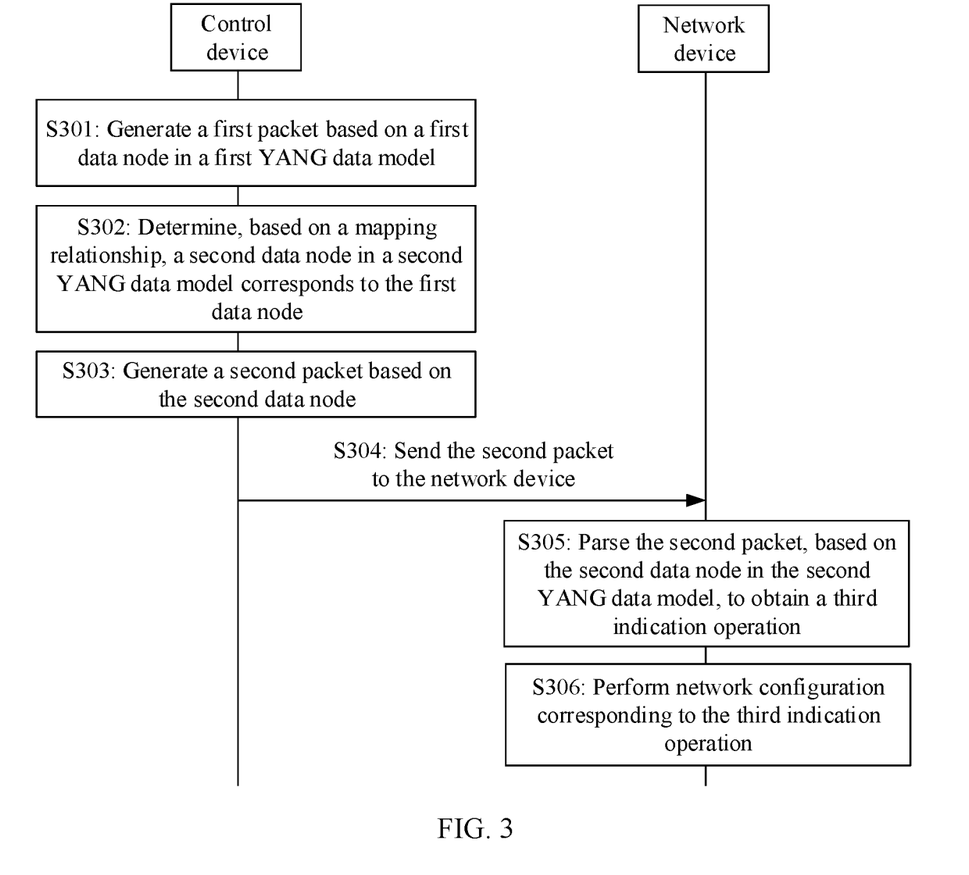
FIG. 3 is a schematic flowchart of another network configuration method according to this application.
Figure 4:
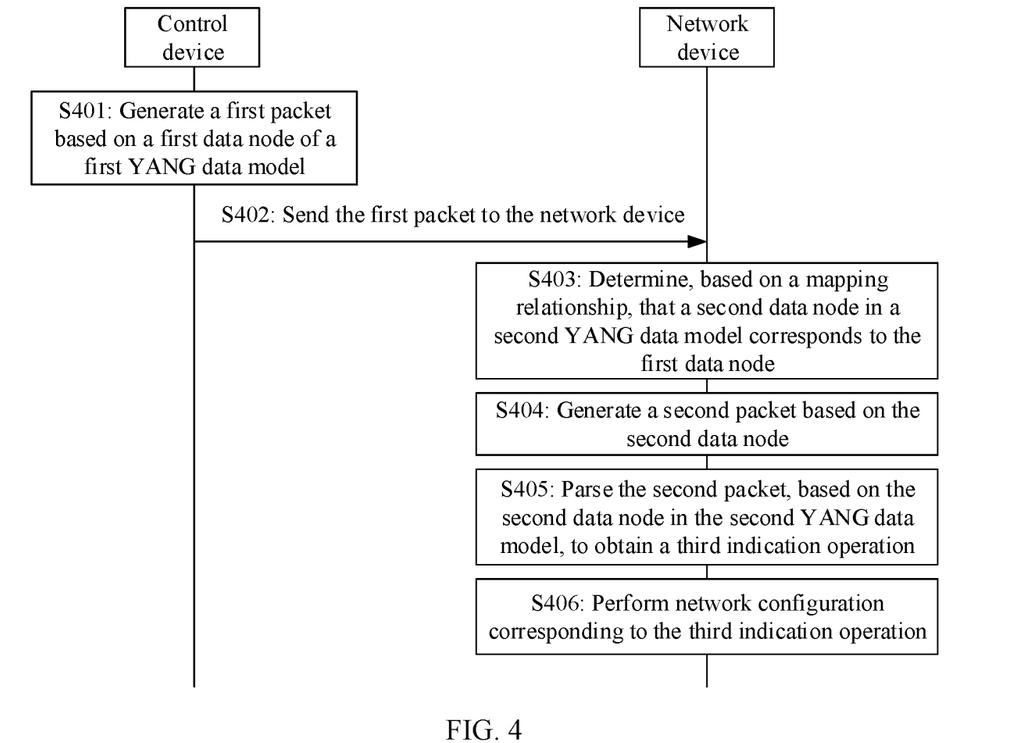
FIG. 4 is a schematic flowchart of still another network configuration method according to this application.

Based on the embodiment shown in FIG. 2, the following further describes a network configuration process in detail by using embodiments shown in FIG. 3 and FIG. 4.

FIG. 3 is a schematic flowchart of another network configuration method according to this application. Referring to FIG. 3, the method may include the following operations.

S301: A control device generates a first packet based on a first data node in a first YANG data model.

In an embodiment, the control device may be a device configured to configure a network device. For example, the control device may be a computer, a network management device, or software that has a network management function.

In an embodiment, the first YANG data model is loaded on the control device. A YANG data model set may be further loaded on the control device. The YANG data model set may include a plurality of different YANG data models. The YANG data models in the YANG data model set are different YANG data models loaded on one or more network devices. For example, the YANG data model set includes the first YANG data model, a second YANG data model and a third YANG data model. A mapping relationship between different YANG data models may be further loaded on the control device.

In an embodiment, a third-party tool used to generate a packet may be loaded on the control device. For example, the third-party tool may be a network management tool. The third-party tool may be used to generate, based on the first data node in the first YANG data model, a packet framework indicated by the first data node, then receive configuration data entered by a user, and generate the first packet based on the packet framework and the configuration data.

For example, it is assumed that indication operation included in the first data node is an IP address configuration operation. Correspondingly, when generating the first packet, the control device may first generate one packet framework based on the first data node by using the third-party tool, then receive an IP address that is entered by the user and that needs to be configured, and fill the IP address into the packet framework to generate the first packet.

It should be noted that the foregoing is merely an example of a method for generating the first packet, and does not limit the method for generating the first packet. In a practical application process, the first packet may be generated based on an actual requirement. This is not limited in this embodiment of the present invention.

In an embodiment, there may be one or more first data nodes based on which the first packet is generated.

S302: The control device determines, based on the mapping relationship that a second data node in the second YANG data model corresponds to the first data node.

In an embodiment, the control device may determine that a YANG data model loaded on a network device on which network configuration is to be performed is the second YANG data model.

In an embodiment, a configuration file may include an identifier of a YANG data model recorded in each network device. Correspondingly, the control device may determine, based on the configuration file, that the YANG data model loaded on the network device on which network configuration is to be performed is the second YANG data model.

In an embodiment, the control device may search the mapping relationship based on the first data node, to find that the second data node in the second YANG data model corresponds to the first data node.

S303: The control device generates a second packet based on the second data node.

It should be noted that for a process in which the control device generates the second packet based on the second data node, refer to a process in which the control device generates the first packet based on the first data node in S301. Details are not described herein again.

S304: The control device sends the second packet to the network device.

In an embodiment, the network device is a device on which network configuration is to be performed. For example, the network device may include a switch, a router, a gateway, and an access point device.

In an embodiment, the second YANG data model is loaded on the network device.

Certainly, another YANG data model may be further loaded on the network device. This is not limited in this application.

S305: The network device parses the second packet based on the second data node in the second YANG data model, to obtain a third indication operation.

S306: The network device performs network configuration corresponding to the third indication operation.

For example, if the network configuration corresponding to the third indication operation is IP address configuration, the network device obtains an IP address from the second packet, and performs network configuration based on the obtained IP address. If the network configuration corresponding to the third indication information is reporting a packet loss rate within a preset time period, the network device sends a packet loss rate of the network device within the preset time period to the control device.

In the embodiment shown in FIG. 3, before sending the first packet to the network device, the control device first converts the first packet into the second packet based on the mapping relationship, the network device is enabled to identify and parse the second packet based on the second YANG data model loaded on the network device, and then, the control device is enabled to perform automatic network configuration on the network device. Because the mapping relationship may be generated based on a similarity between attribute information of a data node in the first YANG model on the control device and attribute information of a data node in the second YANG model on the network device, there is no need to manually learn different YANG data models and compile a translation script between two YANG data models. In this way, development of conversion code is reduced, efficiency of generating the mapping relationship is improved, and then efficiency of network configuration is improved, to implement real intelligent conversion.

It should be noted that in the embodiment shown in FIG. 3, S301 to S304 may be performed by the network device, and S305 and S306 may be performed by the control device.

For a specific process, refer to the embodiment shown in FIG. 3. Details are not described herein again.

FIG. 4 is a schematic flowchart of still another network configuration method according to this application. Referring to FIG. 4, the method may include the following operations.

S401: A control device generates a first packet based on a first data node in a first YANG data model.

It should be noted that for a process of performing S401, refer to S301. Details are not described herein again in this application.

S402: The control device sends the first packet to a network device.

S403: The network device determines, based on a mapping relationship that a second data node in a second YANG data model corresponds to the first data node.

In an embodiment, the second YANG data model is loaded on the network device. A YANG data model set may be further loaded on the network device. The YANG data model set may include a plurality of YANG data models, and the YANG data models in the YANG data model set may include YANG data models loaded on one or more network devices, and YANG data models loaded on the control device. The mapping relationship may be further loaded on the network device.

It should be noted that for a process of performing S403, refer to S302. Details are not described herein again in this application.

S404: The network device generates a second packet based on the second data node.

It should be noted that for a process of performing S404, refer to S301. Details are not described herein again in this application.

S405: The network device parses the second packet based on the second data node in the second YANG data model, to obtain a third indication operation.

S406: The network device performs network configuration corresponding to the third indication operation.

It should be noted that for a process of performing S405 and S406, refer to S305 and S306. Details are not described herein again in this application.

In the embodiment shown in FIG. 4, after receiving the first packet sent by the control device, the network device may convert the first packet into the second packet based on the mapping relationship, and may identify and parse the second packet based on the second YANG data model loaded on the network device, and then the control device is enabled to perform automatic network configuration on the network device. Because the mapping relationship may be generated based on a similarity between attribute information of a data node in the first YANG model on the control device and attribute information of a data node in the second YANG model on the network device, there is no need to manually learn different YANG data models and compile a translation script between two YANG data models. In this way, development of conversion code is reduced, efficiency of generating the mapping relationship is improved, and then efficiency of network configuration is improved, to implement real intelligent conversion.

It should be noted that in the embodiment shown in FIGS. 4, S401 and S402 may be performed by the network device, and S403 to S406 may be performed by the control device. For a specific process, refer to the embodiment shown in FIG. 4. Details are not described herein again.

When any one of the foregoing embodiments is performed, a correspondence between the data node in the first YANG data model and the data node in the second YANG data model needs to be first generated. In a process of generating the correspondence between the data node in the first YANG data model and the data node in the second YANG data model, attribute information of each data node in the first YANG model and attribute information of each data node in the second YANG data model are first determined, and then the correspondence between the data node in the first YANG data model and the data node in the second YANG data model is determined based on the attribute information of each data node in the first YANG model and the attribute information of each data node in the second YANG data model.

It should be noted that the correspondence between the data node in the first YANG data model and the data node in the second YANG data model includes a correspondence between a plurality of groups of data nodes, and each group of data nodes includes at least one data node in the first YANG data model and at least one data node in the second YANG data model. A process of determining a correspondence between each group of data nodes is the same. The following describes in detail a process of determining a correspondence between a third data node in the first YANG data model and a fourth data node in the second YANG data model. For details, refer to the embodiment shown in FIG. 5.

Figure 5:
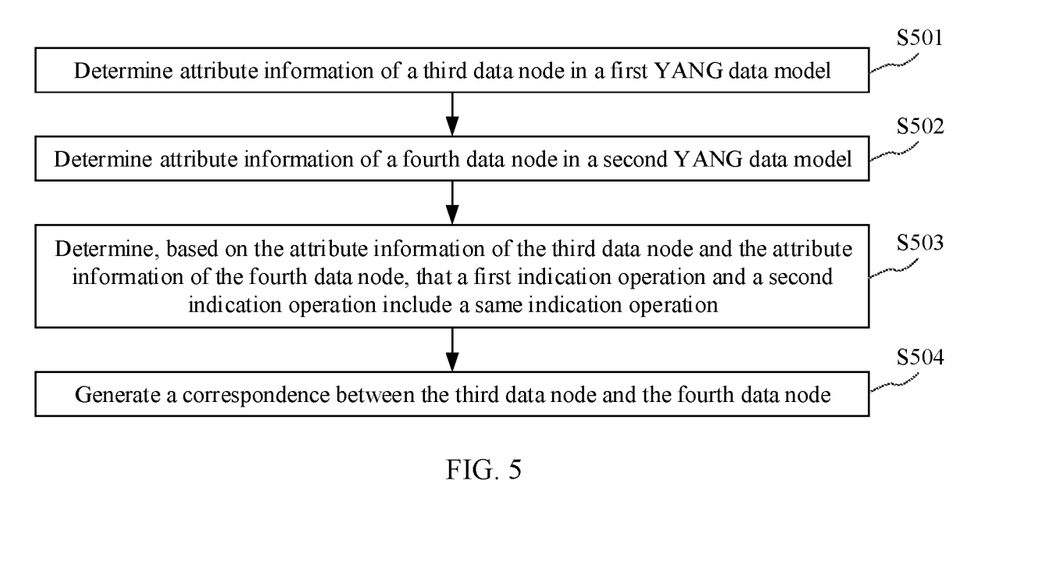
FIG. 5 is a schematic flowchart of a correspondence generation method according to this application.

FIG. 5 is a schematic flowchart of a correspondence generation method according to this application. Referring to FIG. 5, the method may include the following operations.

S501: Determine attribute information of a third data node in a first YANG data model.

The third data node is configured to indicate a first indication operation in the first YANG data model.

In an embodiment, the embodiment shown in FIG. 5 may be performed by a terminal device, or a correspondence generation apparatus disposed in the terminal device. In an embodiment, the terminal device may be a computer, a network management device, or the like. In an embodiment, the correspondence generation apparatus may be implemented by using software, or may be implemented by combining software and hardware.

When generating a correspondence between a data node in the first YANG data model and a data node in a second YANG data model, the terminal device first loads the first YANG data model and the second YANG data model.

In an embodiment, attribute information of a data node is used to describe the data node.

For example, the attribute information of the data node may include: a type of the data node, whether the data node is a key data node, a state of the data node (a usage state or a discarded state), and whether a default value exists.

Certainly, in a practical application process, the attribute information of the data node may further include other information. This is not limited in this application.

A basic unit of a YANG data model is a module. Each module is implemented by using a plurality of statements. In an embodiment, the statements shown in this application may also be referred to as a statement, code, or the like.

In an embodiment, statements in each module of the first YANG data model may be analyzed, to determine the third data node and the attribute information of the third data node in the first YANG data model.

In an embodiment, the first indication operation may indicate to perform network configuration operation on a network device. For example, the network configuration performed on the network device may include setting an IP address of the network device, and setting a virtual local area network (VLAN) of the network device.

In an embodiment, the first indication operation may indicate to obtain state data of the network device. The state data may include inherent attribute data of the network device and current running state data of the network device. For example, the state data may include a quantity of data packets received in a preset time period, a quantity of data packets discarded in the preset time period, and a quantity of data packets forwarded in the preset time period.

Figure 6:
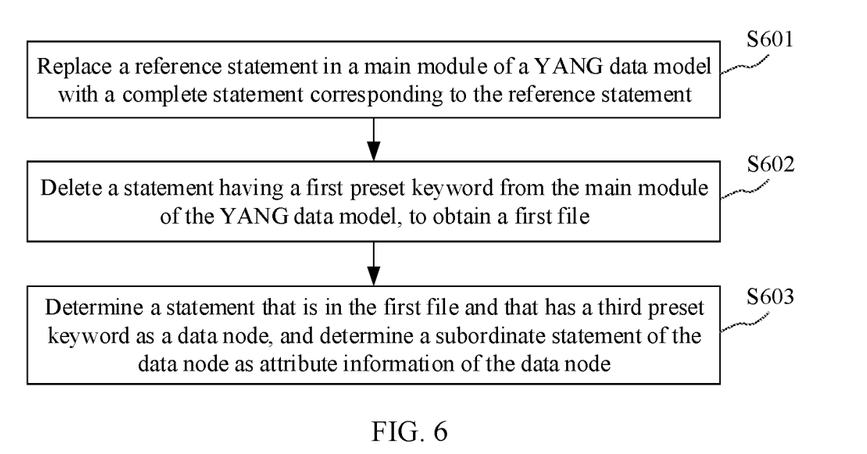
FIG. 6 is a schematic flowchart of a method for determining a data node and attribute information according to this application.

It should be noted that, in the embodiment shown in FIG. 6, a process of determining the third data node and the attribute information of the third data node in the first YANG data model is described in detail, and details are not described herein again.

S502: Determine attribute information of a fourth data node in the second YANG data model.

The fourth data node is configured to indicate a second indication operation in the second YANG data model.

In an embodiment, statements in each module of the second YANG data model may be analyzed, to determine the fourth data node and the attribute information of the fourth data node in the second YANG data model.

In an embodiment, the second indication operation may indicate to perform network configuration operation on the network device. For example, the network configuration performed on the network device may include setting the IP address of the network device, and setting the VLAN of the network device.

In an embodiment, the second indication operation may indicate to obtain the state data of the network device. The state data may include the inherent attribute data of the network device and the current running state data of the network device. For example, the state data may include the quantity of the data packets received in the preset time period, the quantity of the data packets discarded in the preset time period, and the quantity of the data packets forwarded in the preset time period.

It should be noted that, in the embodiment shown in FIG. 6, a process of determining the fourth data node and the attribute information of the fourth data node in the second YANG data model is described in detail, and details are not described herein again.

S503: Determine, based on the attribute information of the third data node and the attribute information of the fourth data node, that the first indication operation and the second indication operation include a same indication operation.

In an embodiment, a similarity between the attribute information of the third data node and attribute information of each data node in the second YANG data model may be obtained. If the similarity between the attribute information of the third data node and the attribute information of the fourth data node is greater than a first preset threshold value, it is determined that the first indication operation and the second indication operation include the same indication operation, and the first preset threshold value may be set as required.

In an embodiment, that the first indication operation and the second indication operation include the same indication operation means that a network configuration action performed by the network device (or the control device) based on the first indication operation is the same as a network configuration action performed by the network device (or the control device) based on the second indication operation, for example, both the network configuration actions are IP address configuration performed on the network devices.

It should be noted that, in a practical application process, the first preset threshold value may be determined based on an actual requirement. This is not limited in this embodiment of the present invention.

S504: Generate a correspondence between the third data node and the fourth data node.

Because the first indication operation and the second indication operation have a same function, the third data node in the first YANG data model corresponds to the fourth data node in the second YANG data model.

In the correspondence generation method provided in this application, when the correspondence between the data node in the first YANG data model and the data node in the second YANG data model is generated, a plurality of data nodes in the first YANG data model and attribute information of each data node are first determined, and a plurality of data nodes in the second YANG data model and attribute information of each data node are then determined. In addition, the correspondence between the data node in the first YANG data model and the data node in the second YANG data model is generated based on the attribute information of each data node in the first YANG data model and the attribute information of each data node in the second YANG data model. If the third data node in the first YANG data model is used to indicate the first indication operation in the first YANG data model, and the fourth data node in the second YANG data model is used to indicate the second indication operation in the second YANG data model, and if based on the attribute information of the third data node and the attribute information of the fourth data node, that the first indication operation and the second indication operation have the same function, the correspondence between the third data node and the fourth data node is generated. Because a mapping relationship is generated based on the attribute information of the data node in the first YANG data model and the attribute information of the data node in the second YANG data model, there is no need to manually learn the first YANG data models and the second YANG data model and compile a translation script between the first YANG data models and the second YANG data model. In this way, development of conversion code is reduced, efficiency of generating the mapping relationship is improved, and then efficiency of network configuration is improved, to implement real intelligent conversion.

For any one of the first YANG data model and the second YANG data model, the plurality of data nodes and the attribute information of each data node may be determined in YANG data models in the following feasible implementation. For details, refer to the embodiment shown in FIG. 6.

FIG. 6 is a schematic flowchart of a method for determining a data node and attribute information according to an embodiment of this application. Referring to FIG. 6, the method may include the following operations.

S601: Replace a reference statement in a main module of a YANG data model with a complete statement corresponding to the reference statement.

In the YANG data model, a module may be divided into the main module and a submodule. One submodule usually defines one single function. The main module may reference the submodule by using a first reference statement, so that the main module has a function corresponding to the submodule.

The YANG data model includes a reusable statement (such as a grouping). The reusable statement defines a reusable data set. The main module may reference the reusable statement by using a second reference statement, so that the main module has data indicated by the reusable statement. For example, in the main module, the usable statement may be referenced by using a use (use) keyword.

In an embodiment, the reference statement in the main module of the YANG data model may be replaced with the complete statement corresponding to the reference statement in the following feasible implementation: A statement that is in the main module and that has a second preset keyword may be determined as the reference statement, to obtain the complete statement corresponding to the reference statement, and replace the reference statement in the main module with the corresponding complete statement.

In an embodiment, the reference statement includes the first reference statement and/or the second reference statement. The first reference statement is a statement of referencing the submodule, and the second reference statement is a statement of referencing the reusable statement.

In an embodiment, the second preset keyword may include the use keyword and the like.

In an embodiment, when the reference statement is used to reference the submodule, the complete statement corresponding to the reference statement is a statement in the referenced submodule. When the reference statement is used to reference the reusable statement, the complete statement corresponding to the reference statement is the referenced reusable statement.

In an embodiment, after the reference statement of referencing the submodule in the main module is replaced with the corresponding complete statement, the submodule may be deleted outside the main module. After the reference statement of referencing the reusable statement in the main module is replaced with the corresponding complete statement, the reusable statement may be deleted outside the main module.

In S601, ambiguity of the statement may be eliminated by replacing the reference statement in the main module with the complete statement corresponding to the reference statement.

For example, assuming that the main module includes a statement 1 and the statement 1 includes the use keyword, the statement 1 is the reference statement. If the statement 1 references a grouping 1 by using the use keyword, the statement 1 may be replaced with all statements in the grouping 1 in the main module. All the statements in the grouping 1 are complete statements corresponding to the statement 1.

Assuming that the main module includes a statement 2, and the statement 2 includes an include keyword, the statement 2 is the reference statement. If the statement 2 references a submodule 1 by using the include keyword, the statement 2 may be replaced with all statements in the submodule 1 in the main module. All the statements in the submodule 1 are complete statements corresponding to the statement 2. It should be noted that, if the submodule 1 includes a statement 3 including the use keyword and the statement 3 is used to reference a grouping 2, the statement 3 needs to be replaced with all statements in the grouping 2 in the submodule 1. All the statements in the grouping 2 are complete statements corresponding to statement 3.

S602: Delete a statement having a first preset keyword from the main module of the YANG data model, to obtain a first file.

In an embodiment, the first preset keyword may include connection statements such as import, include, and belongs-to.

In S602, after the statement having the first preset keyword is deleted from the main module, the first file may not include a redundant statement. The redundant statement is a non-functional statement, to be specific, the redundant statement is not used to generate a packet between a network device and a control device.

S603: Determine a statement that is in the first file and that has a third preset keyword as the data node, and determine a subordinate statement of the data node as the attribute information of the data node.

In an embodiment, the third preset keyword may include a container, a leaf, a leaf-list, a list, and the like.

For example, in the following statement segment in the first file:

```
leaf host-name{
    type string,
    mandatory true, and
    config true
},
``` because the statement "leaf host-name" includes a third preset keyword "leaf", the leaf host-name may be determined as a data node, and a subordinate statement of the data node includes:

type string,
mandatory true, and
config true.

In addition, the foregoing subordinate statement is determined as attribute information of the data node "leaf host-name".

In an embodiment, if a preset file of a first YANG data model includes description information of the data node, a description keyword is determined in the description information of the data node, and the description keyword is added to the attribute information of the data node.

In an embodiment, the description keyword may be determined in the description information of the data node in the following feasible implementation: At least one word is obtained by performing word segmentation processing on the description information; and the description keyword is determined in the at least one word based on a similarity between each word and each keyword that is in a preset keyword dictionary, where the preset keyword dictionary includes a plurality of keywords, and a maximum similarity between the description keyword and the keyword that is in the preset keyword dictionary is greater than a second preset threshold value.

In the embodiment shown in FIG. 6, the ambiguity of the statement may be eliminated by replacing the reference statement in the main module in the YANG data model with the complete statement. The first file is obtained by deleting the statement having the first preset keyword from the main module, so that the redundant statement may be eliminated. The data node and the attribute information corresponding to the data node may be determined in the first file based on keywords included in each statement in the first file.

Based on any one of the foregoing embodiments, the attribute information of the data node may be considered as a short text including a plurality of words. When a similarity between attribute information of two data nodes is calculated, a similarity between short texts corresponding to the attribute information of the two data nodes is required. When the similarity between two short texts is calculated, a similarity between words in different short texts needs to be first calculated, and then the similarity between the short texts is calculated based on the similarity between the words.

In an embodiment, a similarity between two words may be calculated in at least the following two feasible implementations.

One feasible implementation is to calculate the similarity between the two words by using a word network (WordNet) algorithm:

First, semantic disambiguation is performed on a word in the attribute information of the data node by using the WordNet algorithm, to determine a semantic meaning of each word in the attribute information; and then a semantic similarity between the two words is determined by using a semantic similarity calculation formula. In an embodiment, the semantic similarity calculation formula is shown in Formula 1:

$$sim(s_i, s_j) = \frac{wR(s_i, s_j) + wR^{-1}(s_i, s_j)}{2d} \qquad \text{Formula 1}$$

In Formula 1, $s_i$ and $s_j$ are two semantic meanings to be compared, R is a preset relationship, $R^{-1}$ is an inverse of R, d is a maximum depth of a noun class, and w is a weight value.

In an embodiment, a weight value calculation formula may be shown in Formula 2:

$$wR(s_i, s_j) = \max_R - \frac{\max_R - \min_R}{E_R(s_i)} \qquad \text{Formula 2}$$

In Formula 2, $\max_R$ is a maximum weight value assigned to the relationship R, $\min_R$ is a minimum weight assigned to the relationship R, and $E_R(S_i)$ is a quantity of edges of the relationship R that flow out of $s_i$.

The other feasible implementation is to calculate the similarity between the two words by using Word2Vec:

Training is performed on an encyclopedia (for example, Google Wikipedia) and a series of numbered files (Request For Comments, RFC for short) and documents in the YANG data model, to obtain word vectors. A cosine similarity calculation formula is used to obtain a similarity between the word vectors. The cosine similarity calculation formula may be shown in Formula 3:

$$sim(v_i, v_j) = \cos\theta = \frac{\sum_{k=1}^{m} w_{ik} \cdot w_{jk}}{\sqrt{\sum_{k=1}^{m} w_{ik}^2} \times \sqrt{\sum_{k=1}^{m} w_{jk}^2}} \qquad \text{Formula 3}$$

In Formula 3, $v_i$ and $v_j$ are two word vectors to be compared. $w_{ik}$ is a $k^{th}$ element in the vector $v_i$, and $w_{jk}$ is a $k^{th}$ element in the vector $v_j$.

It should be noted that when the similarity between the two word vectors is determined based on the Formula 3, a smaller included angle indicates a higher similarity between the two word vectors.

After the similarity of the words in the attribute information of the data node is calculated by using the WordNet or the Word2Vec, the similarity between the short texts (attribute information) may be calculated by using a word mover's distance (Word Mover's Distance, WMD for short) algorithm.

Assuming that a short text α includes N different words, and a short text β includes M different words, a similarity between the short text α and the short text β may be calculated by using the following Formula 4:

$$sim(\alpha, \beta) = 1 - \frac{WMD_{\alpha,\beta}}{\text{Max}_{\alpha,\beta}} \qquad \text{Formula 4}$$

In Formula 4, $$WMD_{\alpha,\beta} = \min \sum_{i,j=1}^{n} T_{ij} \times c(i, j), \text{ and}$$

$$\text{Max}_{\alpha,\beta} = \frac{\sum_{i=1}^{N} \underset{j}{\text{argmax}}\, c(i, j) + \sum_{j=1}^{M} \underset{i}{\text{argmax}}\, c(j, i)}{N + M}.$$

$\sum_{j=1}^{n} T_{ij}=d_i$, $\forall i \in \{1, 2, \ldots, n\}$, $\sum_{i=1}^{n} T_{ij}=d_j$, $\forall j \in \{1, 2, \ldots, n\}$, $c(i,j)$ is a reciprocal of a similarity between a word i and a word j, and $d_i$ is importance of each word.

In an embodiment, the importance of the word may be calculated by using the following formula 5:

$$d_i = tf_{i,j} \times idf_{i,j},\; tf_{i,j} = \frac{n_{i,j}}{\sum_k n_{k,j}},\; idf_{i,j} = \log\frac{|D|}{|\{j: t_i \in d_j\}|} \qquad \text{Formula 5}$$

In Formula 5, $n_{i,j}$ is a quantity of times that the word appears in a file $d_j$, and $\sum_k n_{k,j}$ is a sum of a quantity of times that all words appear in the file $d_j$. $|D|$ is a total quality of files in a corpus, and $|\{j:t_i \in d_j\}|$ is a quality of files that contain the word. When the word is not in the corpus, a value of the importance of the word is 1.

Figure 7:
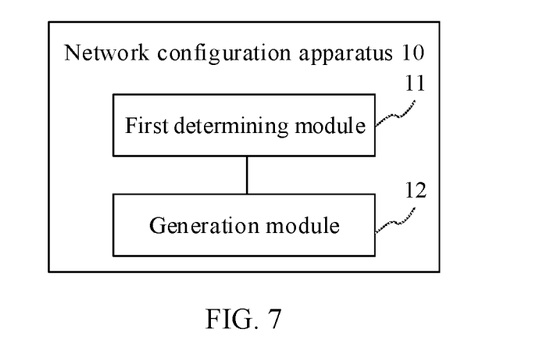
FIG. 7 is a schematic structural diagram of a network configuration apparatus according to this application.

FIG. 7 is a schematic structural diagram of a network configuration apparatus according to this application. The network configuration apparatus 10 may be disposed in a control device or a network device. Referring to FIG. 7, the apparatus may include a first determining module 11 and a generation module 12.

The first determining module 11 is configured to determine, based on a mapping relationship, that a first data node in a first YANG data model corresponds to a second data node in a second YANG data model, where the first data node and the second data node include a same indication operation, and the mapping relationship includes a correspondence between a data node in the first YANG data model and a data node in the second YANG data model.

The generation module 12 is configured to generate a first packet based on the second data node.

In an embodiment, the first determining module 11 performs S202 in the embodiment of FIG. 2, S303 in the embodiment of FIG. 3, and S404 in the embodiment of FIG. 4.

In an embodiment, the generation module 12 may perform S201 in the embodiment of FIG. 2, S302 in the embodiment of FIG. 3, and S403 in the embodiment of FIG. 4.

It should be noted that the network configuration apparatus provided in this application may perform the technical solutions shown in the foregoing method embodiments. Implementation principles and beneficial effects of the network configuration apparatus are similar to those of the method embodiments, and details are not described herein again.

Figure 8:
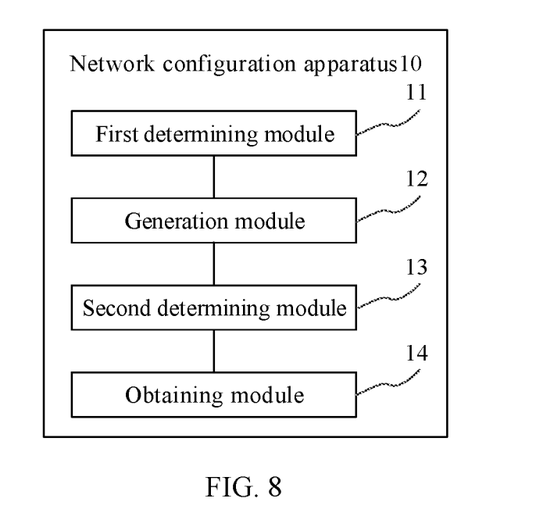
FIG. 8 is another schematic structural diagram of a network configuration apparatus according to this application.

FIG. 8 is another schematic structural diagram of a network configuration apparatus according to this application. Based on the embodiment shown in FIG. 7, referring to FIG. 8. The network configuration apparatus 10 further includes a second determining module 13 and a generation module 14.

The second determining module 13 is configured to determine attribute information of a third data node in the first YANG data model, where the third data node is configured to indicate a first indication operation in the first YANG data model.

The second determining module 13 is further configured to determine attribute information of a fourth data node in the second YANG data model, where the fourth data node is configured to indicate a second indication operation in the second YANG data model.

The second determining module 13 is further configured to determine, based on the attribute information of the third data node and the attribute information of the fourth data node, that the first indication operation and the second indication operation include a same indication operation.

The generation module 14 is configured to generate a correspondence between the third data node and the fourth data node.

In an embodiment, the second determining module 13 may perform the embodiment shown in FIG. 5.

In a possible implementation, the apparatus further includes an obtaining module 15.

The obtaining module 15 is configured to obtain the first data node from a second packet, where the second packet is generated based on the first data node.

In a possible implementation, the second determining module 13 is configured to:

determine, based on a matching value between the attribute information of the third data node and the attribute information of the fourth node, that the first indication operation and the second indication operation include the same indication operation, where the matching value is obtained by calculating a text similarity between the attribute information of the third data node and the attribute information of the fourth node.

It should be noted that the network configuration apparatus provided in this application may perform the technical solutions shown in the foregoing method embodiments. Implementation principles and beneficial effects of the network configuration apparatus are similar to those of the method embodiments, and details are not described herein again.

Figure 9:
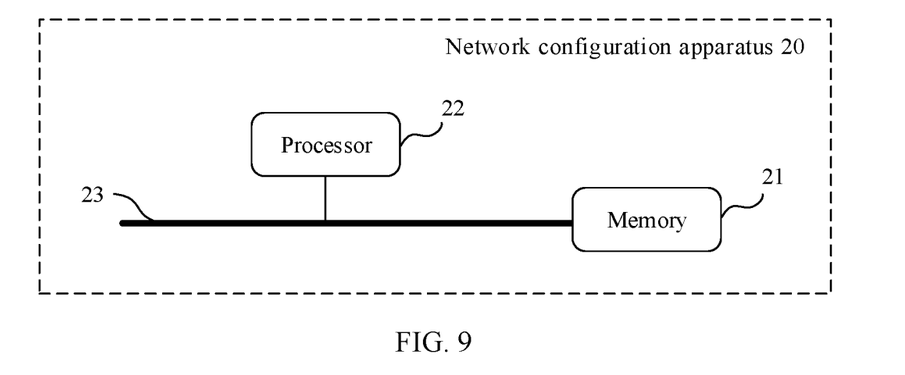
FIG. 9 is a schematic diagram of a hardware structure of a network configuration apparatus according to this application.

FIG. 9 is a schematic diagram of a hardware structure of a network configuration apparatus according to this application. Referring to FIG. 9, the network configuration apparatus 20 includes a memory 21 and a processor 22, where the memory 21 communicates with the processor 22. For example, the memory 21 communicates with the processor 22 by using a communications bus 23. The memory 21 is configured to store a computer program, and the processor 22 executes the computer program to implement the method shown in the foregoing embodiments.

In an embodiment, the network configuration apparatus may further include a transmitter and/or a receiver.

In an embodiment, the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. With reference to the operations of the method disclosed in this application (S201 to S203 in the embodiment of FIG. 2, S301 to S303, S305 and S306 in the embodiment of FIGS. 3, S401 and S403 to S406 in the embodiment of FIG. 4, S501 to S504 in the embodiment in FIG. 5, and S601 to S603 in the embodiment in FIG. 6), processing may be directly performed and completed by a hardware processor, or may be performed and completed by combining hardware and software modules in the processor.

This application provides a computer-readable storage medium, including an instruction. When the instruction is run on a computer, the computer is enabled to perform a network configuration method provided in any one of the foregoing method embodiments.

Figure 10:
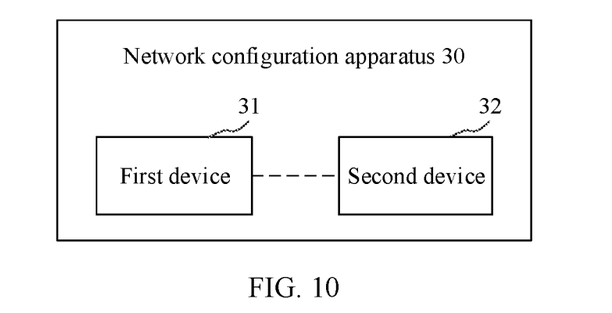
FIG. 10 is a schematic structural diagram of a network configuration system according to this application.

FIG. 10 is a schematic structural diagram of a network configuration system according to this application. Referring to FIG. 10, the network configuration system 30 includes a first device 31 and a second device 32, where the first device 31 and/or the second device 32 include/includes the network configuration apparatus according to any one of the foregoing embodiments.

In an embodiment, the first device 31 may be a control device, and correspondingly, the second device 32 may be a network device.

In an embodiment, the first device 31 may be a network device, and correspondingly, the second device 32 may be a control device.

This application provides a chip. The chip is configured to support a control device in implementing functions (for example, a function of generating a packet, a function of determining a correspondence between data nodes, and a function of sending the packet) shown in embodiments of this application, for example, a function of processing or sending the data and/or the information in the foregoing method. The chip is used in a chip system. The chip system may include the chip, or may include the chip and another discrete device. When the foregoing method is implemented by the chip in the control device, the chip includes a processing unit and a communications unit. The processing unit may be, for example, a processor. The communications unit may be, for example, an input/output interface, a pin, or a circuit. The processing unit performs all or some indication actions performed by a processing module of the control device in this embodiment of this application, and the communications unit may perform an action corresponding to an action performed by a sending module of the control device in this embodiment of this application. For example, when the sending module of the control device sends a radio frequency signal, the communications unit sends a baseband signal corresponding to the radio frequency signal. In another specific embodiment, the processing module of the control device in this application may be the processing unit of the chip, and the sending module of the control device may be the communications unit of the chip.

This application provides a chip. The chip is configured to support a network device in implementing functions (for example, a function of generating a packet, a function of determining a correspondence between data nodes, a function of sending the packet, a function of parsing the packet, and a function of performing network configuration) shown in the embodiments of this application, for example, a function of processing or receiving the data and/or the information in the foregoing method. The chip is used in a chip system. The chip system may include the chip, or may include the chip and another discrete device. When the foregoing method is implemented by the chip in the network device, the chip includes a processing unit and a communications unit. The processing unit may be, for example, a processor. The communications unit may be, for example, an input/output interface, a pin, or a circuit. The processing unit performs all or some indication actions performed by a processing module of the network device in this embodiment of this application, and the communications unit may perform an action corresponding to an action performed by a receiving module of the network device in this embodiment of this application. For example, when the receiving module of the network device receives a radio frequency signal, the communications unit receives a baseband signal corresponding to the radio frequency signal. In another specific embodiment, the processing module of the network device in this application may be the processing unit of the chip, and the receiving module of the network device may be the communications unit of the chip.

All or some of the operations in the foregoing method embodiments may be implemented by hardware related to a program instruction. The foregoing program may be stored in a readable memory. When the program is executed, the operations in the foregoing method embodiments are performed. The foregoing memory (storage medium) includes: a read-only memory (ROM), a RAM, a flash memory, a hard disk, a solid-state drive, a magnetic tape, a floppy disk, an optical disc, and any combination thereof.

The embodiments of this application are described with reference to flowcharts and/or block diagrams of the method, the device (system), and a computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of any other programmable data processing device to generate a machine, so that instructions executed by the computer or the processing unit of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

These computer program instructions may be loaded on the computer or another programmable data processing device, so that a series of operation operations are performed on the computer or the another programmable device to produce processing implemented by the computer. Therefore, the instructions executed on the computer or the another programmable device provide operations for implementing the specific function in the one or more processes in the flowcharts and/or in the one or more blocks in the block diagrams.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method, comprising:
determining, based on a mapping relationship, that a first data node in a first YANG data model corresponds to a second data node in a second YANG data model, wherein the mapping relationship comprises a correspondence between a data node in the first YANG data model and a data node in the second YANG data model; and
generating a first packet based on the second data node, wherein the first packet is further generated by converting a second packet based on the mapping relationship,
wherein the first packet and the second packet include a same indication operation.

2. The method according to claim 1, further comprising:
determining attribute information of a third data node in the first YANG data model, wherein the third data node is configured to indicate a first indication operation in the first YANG data model;
determining attribute information of a fourth data node in the second YANG data model, wherein the fourth data node is configured to indicate a second indication operation in the second YANG data model;
determining, based on the attribute information of the third data node and the attribute information of the fourth data node, that the first indication operation and the second indication operation comprise a same indication operation; and
generating a correspondence between the third data node and the fourth data node.

3. The method according to claim 1, further comprising obtaining the first data node from the second packet, wherein the second packet is generated based on the first data node.

4. The method according to claim 2, wherein the determining that the first indication operation and the second indication operation comprise a same indication operation comprises:
determining, based on a matching value between the attribute information of the third data node and the attribute information of the fourth node, that the first indication operation and the second indication operation comprise the same indication operation, wherein the matching value is obtained by calculating a text similarity between the attribute information of the third data node and the attribute information of the fourth node.

5. An apparatus, comprising:
a memory storing an instruction; and
a processor configured to communicate with the memory, wherein the processor is configured to execute the instruction to perform operations, the operations comprising:
determining, based on a mapping relationship, that a first data node in a first YANG data model corresponds to a second data node in a second YANG data model, wherein the mapping relationship comprises a correspondence between a data node in the first YANG data model and a data node in the second YANG data model; and
generating a first packet based on the second data node, wherein the first packet is further generated by converting a second packet based on the mapping relationship,
wherein the first packet and the second packet include a same indication operation.

6. The apparatus according to claim 5, wherein the operations further comprise:
determining attribute information of a third data node in the first YANG data model, and the third data node is configured to indicate a first indication operation in the first YANG data model;
determining attribute information of a fourth data node in the second YANG data model, and the fourth data node is configured to indicate a second indication operation in the second YANG data model;
determining, based on the attribute information of the third data node and the attribute information of the fourth data node, that the first indication operation and the second indication operation comprise a same indication operation; and
generating a correspondence between the third data node and the fourth data node.

7. The apparatus according to claim 5, wherein the operations further comprise:
obtaining the first data node from the second packet, and the second packet is generated based on the first data node.

8. The apparatus according to claim 6, wherein the operations further comprise:
determining, based on a matching value between the attribute information of the third data node and the attribute information of the fourth node, that the first indication operation and the second indication operation comprise the same indication operation, wherein the matching value is obtained by calculating a text similarity between the attribute information of the third data node and the attribute information of the fourth node.

9. A computer-readable storage medium comprising an instruction stored therein, which when executed on a computer, cause the computer to perform operations, the operations comprising:
determining, based on a mapping relationship, that a first data node in a first YANG data model corresponds to a second data node in a second YANG data model, wherein the mapping relationship comprises a correspondence between a data node in the first YANG data model and a data node in the second YANG data model; and
generating a first packet based on the second data node, wherein the first packet is further generated by converting a second packet based on the mapping relationship,
wherein the first packet and the second packet include a same indication operation.

10. The computer-readable storage medium according to claim 9, wherein the operations further comprise:
determining attribute information of a third data node in the first YANG data model, and the third data node is configured to indicate a first indication operation in the first YANG data model;
determining attribute information of a fourth data node in the second YANG data model, and the fourth data node is configured to indicate a second indication operation in the second YANG data model;
determining, based on the attribute information of the third data node and the attribute information of the fourth data node, that the first indication operation and the second indication operation comprise a same indication operation; and generating a correspondence between the third data node and the fourth data node.

11. The computer-readable storage medium according to claim 9, wherein the operations further comprise:
obtaining the first data node from the second packet, and the second packet is generated based on the first data node.

12. The computer-readable storage medium according to claim 10, wherein the operations further comprise:
determining, based on a matching value between the attribute information of the third data node and the attribute information of the fourth node, that the first indication operation and the second indication operation comprise the same indication operation, wherein the matching value is obtained by calculating a text similarity between the attribute information of the third data node and the attribute information of the fourth node.

* * * * *